June 9, 1936.  E. M. HORN  2,043,797
FOOD COOKING AND SERVICE TABLE
Filed Feb. 13, 1935  2 Sheets-Sheet 1
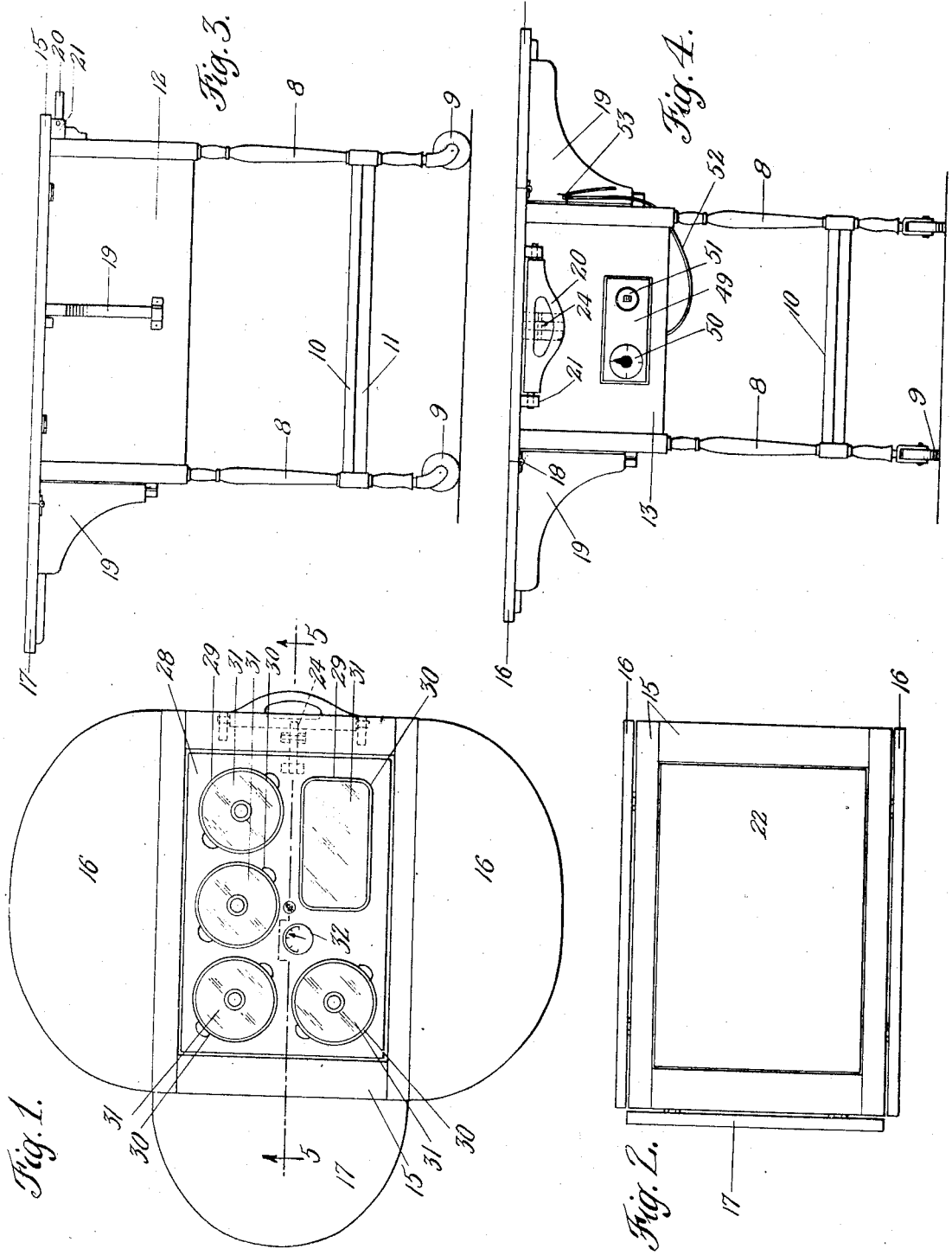
INVENTOR.
Elizabeth M. Horn
BY
Synnestvedt & Lechner
ATTORNEYS.

June 9, 1936.  E. M. HORN  2,043,797
FOOD COOKING AND SERVICE TABLE
Filed Feb. 13, 1935  2 Sheets-Sheet 2

INVENTOR
Elizabeth M. Horn
BY
Synnestvedt & Lechner
ATTORNEYS

Patented June 9, 1936

2,043,797

UNITED STATES PATENT OFFICE 2,043,797

FOOD COOKING AND SERVICE TABLE

Elizabeth M. Horn, Yeadon, Pa.

Application February 13, 1935, Serial No. 6,285

7 Claims. (Cl. 219—19)

My invention relates to improvements in electric food cooking and service tables and has for its primary object the provision of tables of this character which may be used for both cooking and serving food conveniently and efficiently.

A further object of my invention is the provision of a table of the kind referred to which may be readily moved to any part of the house and will provide a complete food warming service for a meal accommodating a few or many persons and also at high or medium heats provide a steam cooker of large capacity.

A further object of my invention is the provision of a table of the kind referred to which is of pleasing appearance, convenient arrangement and so designed that it will form an attractive piece of furniture without in any way interfering with its use as a food cooking and service table.

Another object is the provision of a table of the character referred to which is so designed as to conserve the heat within the heating compartment so that the temperature of the room in which it is used will not be undesirably increased.

A further object is the provision in a table of the character referred to of a novel means of insulation of the heating compartment.

Another object is the provision of an improved electric heating arrangement with novel means for securing even distribution of the heat in the heating compartment.

A further object is the provision in a table of the character referred to of convenient additional electrical outlets to which additional electrical appliances may be attached.

I have illustrated the preferred form of my invention in the accompanying drawings, wherein—

Figure 1 is a top plan view of the table showing the drop leaves swung out and food receptacles in place.

Figure 2 is a top plan view with the drop leaves swung down and top panel in place.

Figure 3 is a side elevation.

Figure 4 is an end elevation.

Figure 5:
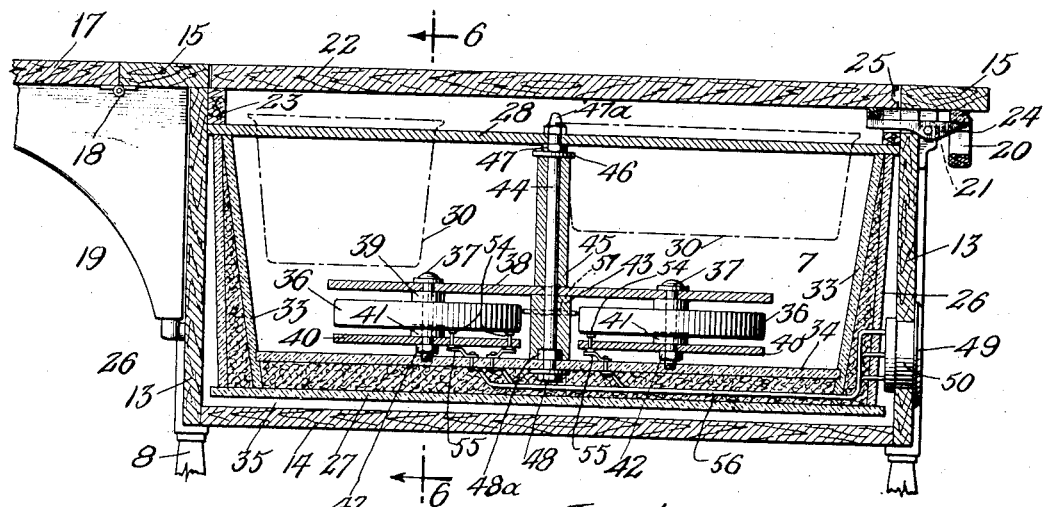
Figure 5 is a longitudinal sectional view taken substantially on the line 5—5 of Figure 1.
Figure 6:
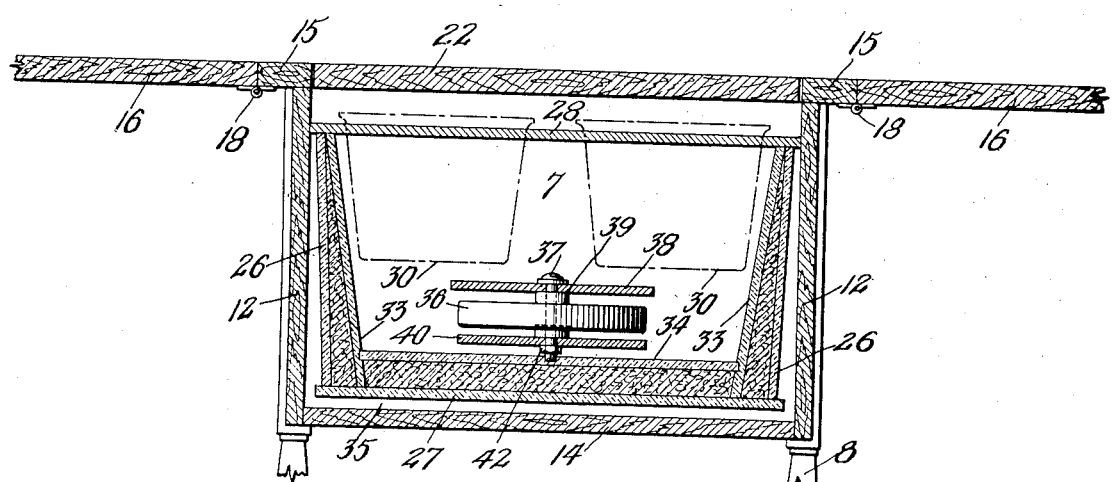
Figure 6 is a transverse sectional view taken substantially on the line 6—6 of Figure 5.

The table comprises the heating compartment indicated generally by reference letter 7 which is supported by legs 8 mounted on rubber casters 9. Reference numeral 10 indicates a utility shelf which is carried by supports 11 secured to legs 8.

The heating compartment 7 consists of an outer cabinet with side and end walls 12 and 13, respectively, and bottom wall 14. These walls are made of wood with an outer surface finished as is usual with any piece of furniture. The finish should be of a kind which is impervious to moisture and will not crack when heated.

Ledge or shelf members 15 are secured to the top of the end and side walls and drop leaves 16 on the sides and 17 on one end are hinged by hinges 18 to the ledges 15. Suitable swinging braces 19 are provided to support the drop leaves when they are swung up. The handle 20 is hinged to handle brackets 21 which in turn are secured to the one end wall of the cabinet.

There is also provided a top panel 22 which rests on beads 23 when the table is to be closed and not in use as a service or cooking table. This provides a flat top which makes the table useful for many purposes. To facilitate lifting of the panel 22 I provide a pivoted lever 24 which extends through the cabinet wall 13. By depressing the outer end of this lever 24 the inner end of the lever is caused to bear against panel 22 and raise it slightly. This will expose one end of the panel having a finger groove 25 by means of which the panel may be further lifted and removed.

Within the outer cabinet there is arranged an inner double walled cabinet in which I dispose the electrical heating apparatus and the food receptacles. This inner cabinet consists of the upright side and end walls 26, bottom 27 and top panel 28 having appropriate openings 29 for food receptacles 30 which may be of different shapes. Proper covers 31 are provided for these receptacles. I also provide a thermometer 32 in this top panel 28 for temperature guidance. Inner upright walls 33 of heat resisting material and the inner bottom 34 of the same material form a lining for the heat compartment. These inner walls 33 and bottom 34 are spaced from the walls 26 and bottom 27, respectively, and the space between the walls is filled with a plastic insulating material which hardens when dry. The air space 35 between the walls 26 and bottom 27 of the inner cabinet and the walls 12 and 13 and bottom 14 of the outer cabinet also provides further insulation to prevent loss of heat.

The heating unit as a whole consists of two circular heaters 36 carried by bolts 37. Above the two heating elements 36 there is a common baffle plate 38 carried by the bolts 37 and spaced from heaters 36 by bushings 39. Below each heater 36 is another baffle 40 carried by the bolt 37 and spaced from the heater or bushing 41.

The assembly of heaters, baffle plates and bushing are held on bolts 37 by nuts 42.

Suitable holes are provided in the upper face of the bottom 34 into which the lower ends of bolts 37 fit to facilitate proper placement of the heating unit and support thereof.

The heating unit is further supported by bushing 43 carried by rod 44 which extends from the top panel 28 to the inner bottom 3b. This rod has an acorn nut 47a at the upper end.

The rod is also provided with a bushing 45 above baffle 38 and the upper end of this bushing abuts against washer 46 under nut 47. The rod 44 is held securely in place by nuts 48a and 48, above and below bottom 34. By this arrangement the rod 44 helps to support top panel 28 and this is important when the food receptacles are full. The bushing 45 is provided to hold baffle 38 and associated parts securely in position.

Two circular heaters 36 are used instead of a single heater in order to distribute the heat more evenly throughout the heating compartment. For the same reason each of the circular heaters are constructed to have an extended surface. This arrangemnt avoids concentration of the heat. The baffles also assist in distribution of the heat and I have found that the heating assembly provides an even distribution of heat which has hitherto been difficult to secure.

The heaters are connected into the electric circuit by means of terminals 54 which extend through the baffles 40 into contact with spring clips 55 which are connected by the wires 56 with the switch 50. The circuits of the two heaters are interconnected by wires 57 which extend from one heater to the other.

The heating assembly as a whole can be lifted bodily from the compartment 7 when the acorn nut 47a is unscrewed, the top 28 lifted and nut 47 removed. This arrangement gives a quick and convenient mode of access to the heaters and associated parts if repairs are required.

I prefer an arrangement which will provide high, low and medium heats embodying two circuits which may be connected in series or in parallel and in which one circuit may be cut out, in order to give the desired ranges of temperature. A thermostat may also be used to cut out one of the circuits when the temperature exceeds a predetermined maximum in the high range.

A convenient arrangement for the electrical switch is provided in one end 13 of the cabinet. This consists of panel 49 having variable heat control switch 50 at one end and electrical outlet socket 51 at the other end which may be used when it is desired to use some other piece of electrical equipment such as a toaster or percolator. The electrical cord 52 is used to connect heaters 36 to source of electric current and when not in use may be coiled about hook 53 under one of the side drop leaves.

From the foregoing description it will be seen that I have provided a convenient and effective service table which may be readily moved from room to room. The table may be used for cooking of all sorts of food when the electric switch is turned to provide high temperatures and when the food has been cooked or the correct temperature reached the switch may be turned to low and the proper warming heat will be maintained for serving. The drop leaves are to be used to sustain the weight of heavy dinner plates, cups and saucers, percolators and other appliances. When a meal has been served the top panel may be placed in position and the dishes, etc. placed thereon and wheeled away.

I claim:

1. A service table of the character described having a heating compartment with inner walls thereof heat insulated from outer walls thereof, a top panel having openings with food receptacles therein, a plurality of electrical heating means within said heating compartment, a rod secured to the inner bottom wall and extending to and supporting said top panel and means securing said electrical heating means to said rod comprising a baffle plate extending over and secured to the heating means.

2. A service table of the character described having a heating compartment with inner walls thereof heat insulated from outer walls thereof, a top panel having openings with food receptacles therein, a plurality of electrical heating means within said heating compartment, a rod secured to the inner bottom wall and extending to and supporting said top panel and means securing said electrical heating means to said rod comprising a baffle plate extending over and secured to the heating means, said baffle plate being secured to the rod between two bushings mounted about the rod.

3. A service table of the character described having a heating compartment with inner walls thereof heat insulated from outer walls thereof, a top panel having openings with food receptacles therein, electrical heating means within said heating compartment, said heating means comprising a plurality of heating elements secured to a common heat baffle plate, a supporting rod extending from the inner bottom wall to the top panel and means securing said baffle plate to said rod.

4. A service table of the character described having a heating compartment with inner walls thereof heat insulated from outer walls thereof, a top panel having openings with food receptacles therein, electrical heating means within said heating compartment, said heating means comprising a plurality of heating elements secured to a common heat baffle plate, a detachable supporting rod extending from the inner bottom wall to the top panel and means securing said baffle plate to said rod.

5. A service table of the character described having a heating compartment with inner walls thereof heat insulated from outer walls thereof, a top panel having openings with food receptacles therein, electrical heating means within said heating compartment, said heating means comprising a plurality of heating elements secured to a common heat baffle plate and having downwardly extending terminals, means supporting said common baffle plate, and contact terminals connected to an electric switch, adapted to engage said downwardly extending terminals, the said heating elements, baffle plate and downwardly extending terminals constituting a heating assembly which may be removed as a unit.

6. A service table of the character described having a heating compartment with inner walls thereof heat insulated from outer walls thereof, a top panel having openings with food receptacles therein, electrical heating means within said heating compartment, said heating means comprising a plurality of heating elements having lower baffle plates secured to and spaced from the elements and a common upper baffle plate to which said elements and lower baffle plates are secured, a supporting rod extending from the inner bottom wall to the top panel and means securing the upper baffle plate to said rod whereby the assembled heating elements and baffle plates are supported by said rod.

7. A service table of the character described having a heating compartment with inner walls heat insulated from outer walls thereof, a top panel having openings with food receptacles therein, electric heating means within said heating compartment, said heating means comprising a plurality of heating elements connected to a common upper baffle plate, each element having a separate lower baffle plate, terminals extending downwardly from the elements through the lower baffle plates, contact terminals connected to an electric switch adapted to engage said downwardly extending terminals, and means supporting the common baffle plate, said heating elements, baffle plates and downwardly extending terminals constituting a heating assembly which may be removed as a unit.

ELIZABETH M. HORN.